United States Patent

Williams

[15] 3,697,707

[45] Oct. 10, 1972

[54] CARD POSITION SENSING APPARATUS

[72] Inventor: Kenneth Barnett Williams, Austin, Tex.

[73] Assignee: International Business Machines Corporation, Armonk, N.Y.

[22] Filed: Oct. 22, 1971

[21] Appl. No.: 191,678

[52] U.S. Cl. ..................200/46, 340/282, 200/61.46

[51] Int. Cl. ..............................................H01h 29/02

[58] Field of Search .............200/46, 61.46; 250/219; 235/61.11; 340/282

[56] References Cited

UNITED STATES PATENTS 3,521,033 7/1970 May.........................200/46 X

*Primary Examiner*—Herman J. Hohauser
*Attorney*—James H. Barksdale, Jr. et al.

[57] ABSTRACT

A card position sensing apparatus for sensing the position of a record card on a card deck relative to a read/write head. The apparatus has a first follower and shunting member actuatable by the leading edge of a forwardly moving record card, and a second follower and shunting member actuatable by the leading edge of a rearwardly moving record card. Cooperating members are connected to the first and second followers for tripping the first follower to bias it against the edge of the card when the second follower is actuated and for tripping the second follower to bias it against the edge of the card when the first follower is actuated. The apparatus also has switches operable by the first and second shunting members for providing signals indicative of the position of a forwardly and rearwardly moving record card relative to the read/write head for beginning and ending a read/write operation and for activating the drive mechanism which drives the record card in the forward and rearward direction. The structural cooperation of the first and second followers which are spring biased is such that actuation and positioning of one will effect tripping of the other, providing very accurate sensing of the position of the card.

14 Claims, 5 Drawing Figures

CARD POSITION SENSING APPARATUS

BACKGROUND OF THE INVENTION

1. Field of the Invention

This invention relates generally to record card sensing mechanisms, and more specifically, to an inexpensive and accurate sensing apparatus for sensing the position of a record card on a card deck relative to a read/write head for purposes of initiating and stopping reading and writing, determining when the card is to be driven in the forward and reverse directions, and determining when the record card has been ejected from the card deck.

2. Description of the Prior Art

Heretofore, any number of devices have been provided for sensing cards and documents and for sensing the edges and sides of documents for controlling the document as it is transported along the bed of the card deck. Such sensing devices have included photosensors, vacuum devices, acoustical devices, etc., and illustrative of some of the closest known prior art in this area are U.S. Pat. No. 3,479,026 and IBM Technical Disclosure Bulletins, Vol. 9, No. 7, Dec., 1966, page 844 and Vol. 11, No. 11, Apr., 1969, page 1593.

In the above mentioned patent an acoustical sensor is provided which acts as a front or side gauge for documents in transport and is made up of a hollow tube attached to the document bed plate with a speaker attached to the hollow tube. Changes in acoustical impedance and the corresponding change in electrical impedance are used for controlling the position of the document as it is transported along the bed plate. The first IBM TDB mentioned above makes use of a vacuum source and piston and a light responsive element associated with the piston for indicating the presence of a document. The second IBM TDB relates to circuits for detecting small changes in capacitance for detecting the presence of documents in a document handling apparatus.

SUMMARY OF THE INVENTION

Briefly, a card position sensing apparatus is provided for sensing the position of a record card on a card deck relative to a read/write head. The apparatus has a first angularly positionable card follower actuatable by the leading edge of a forwardly moving record card, a second angularly positionable card follower actuatable by the leading edge of a rearwardly moving record card, and switch actuators associated with the card followers. The second card follower cooperates with the first card follower and is trippable into contact with the side of a forwardly moving record card and positionable into contact with the trailing edge of a forwardly moving record card. The first card follower cooperates with the second card follower and is trippable into contact with the side of a rearwardly moving record card and positionable into contact with the trailing edge of a rearwardly moving record card. Reed switches and associated magnets are provided which are trippable by the switch actuators which are magnetic shunts. Signals are generated upon the tripping of the reed switches and these signals are used to indicate the position of forwardly and rearwardly moving record cards relative to said read/write head.

DESCRIPTION OF THE PREFERRED EMBODIMENTS

Figure 1:
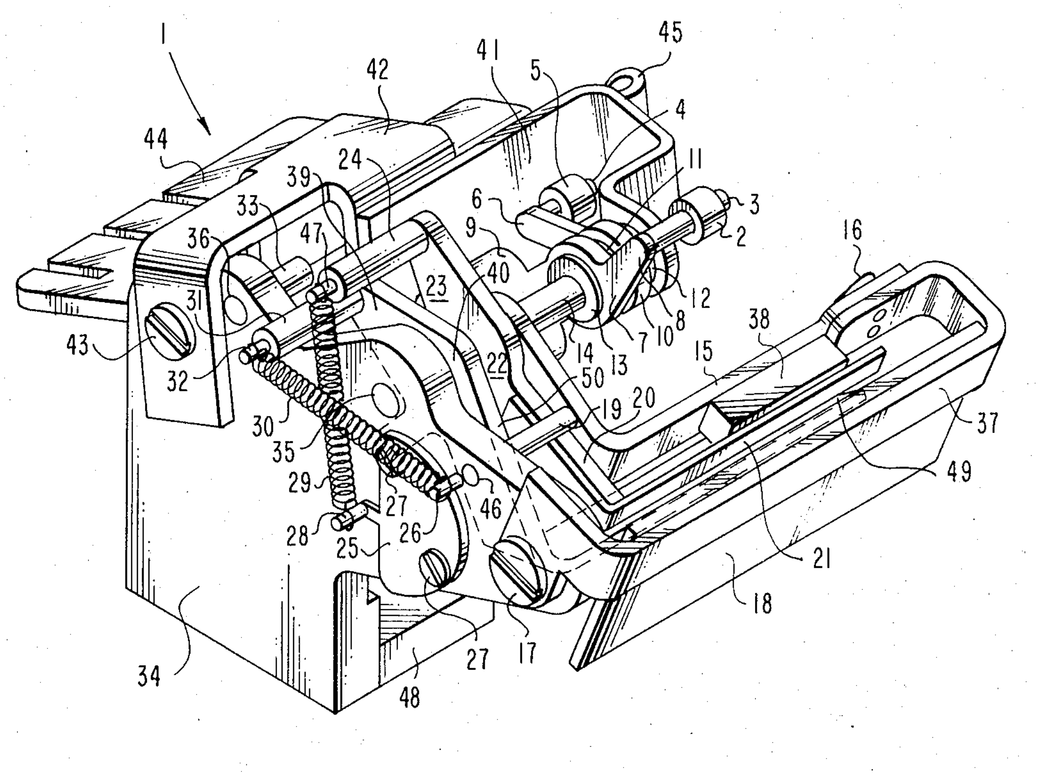
FIG. 1 is a perspective view of the apparatus according to this invention.
Figure 3:
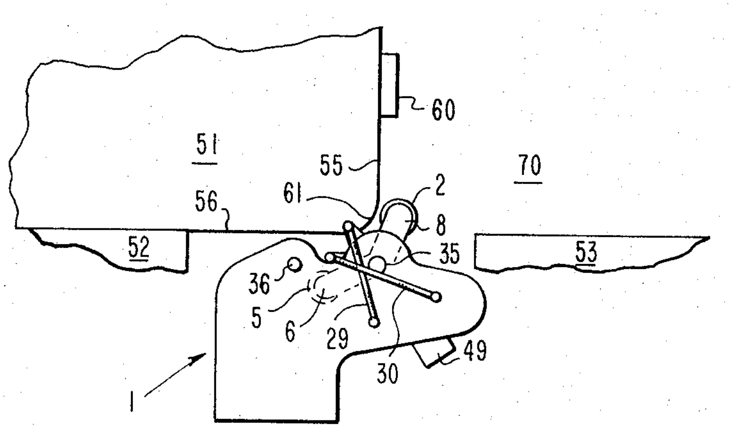
FIG. 3 is a plan view of the apparatus according to this invention and the associated guide rails, base plate, read/write head, and record card, and corresponds component position wise to that shown in FIG. 1.

The following description of the preferred embodiment shown in the drawing is first directed to FIGS. 1 and 3 and a forwardly moving record card.

Forwardly Moving Card

The position of the components of the apparatus shown in FIG. 1 is the same as is shown in FIG. 3. For a forwardly moving (to the right as shown in FIG. 3) record card 51 to be driven by a card driving mechanism comprised of drive rollers (not shown) and guided by guide rails 52 and 53 on the base plate 70 of a card deck (not shown), the leading edge 55 of record card 51 is sensed for purposes of determining when to activate the drive mechanism. The card 51 is initially either manually or otherwise inserted into the card deck until the leading edge 55 contacts and actuates card or roller follower 2.

A more detailed understanding of the movement of card 51 and the sensing thereof is obtainable from the following description of the card position sensing apparatus generally denoted by reference numeral 1. Apparatus 1 is mounted on the card deck through mounting portion 48 by means not shown and is made up of frame 34 having circuit card brackets 37 and 42 secured thereto by means of screws 17 and 43, respectively. Card bracket 37 has secured thereto circuit card 18 which has a reed switch 65, (refer to FIG. 2) and bracket 42 has secured thereto circuit card 44 carrying reed switch 66 (refer to FIG. 2). Magnet support 15 is secured to bracket 37 on one end by means of screws 16 and is supported about its other end by shaft 14. Magnet 38 is attached to support 15 by bonding or other suitable means, and is disposed opposite reed switch 65. Magnet support 41 is supported on one end by shaft 14 which is positioned in opening 71 and on the other end by arm 45 of bracket 42 by means not shown.

Shaft 14 is securely journaled in opening 35 of frame 34, and has rotatably mounted thereon follower 7 having follower arm 8, roller shaft 3 and roller 2 on one side and tripping channel 9 on the other side. Also rotatably mounted on shaft 14 and integral with follower 7 and tripping channel 9 is crank 22 having outwardly extending arms 20 and 23. Tabernacle 24 is securely mounted on arm 23 and carries spring stud 47. On arm 20 of crank 22 is secured shunting member 21 which, when positioned, and removed from, between magnet 38 and reed switch 65 on card 18, causes the tripping of reed switch 65.

Reference to the tripping of reed switches 65 and 66 is to be taken as the opening (drop) and closing (pick) of the contacts making up the reed switch. Also, as will be appreciated by those skilled in the art, with the shunt, magnet and reed switch arrangement shown, the extent of interposition of the shunt between the magnet and reed switch is different for opening than for closing the contacts due to the fact that the required flux density for holding the contacts closed is less than for closing the contacts.

Follower 7 and integral crank 22 are maintained in the position shown in FIG. 1 by spring 29 connected to spring stud 47 and spring stud 28 carried by stud plate 25 which is secured to frame 34 by means of screws 27.

Now referring also to FIG. 3, when the leading edge 55 of record card 51 contacts roller 2, follower 7 and crank 22 are rotated. Shunting member 21 secured to arm 20 of crank 22 is also rotated and reed switch 65 on card 18 is picked. A signal generated by the picking of reed switch 65 will indicate that card 51 is being inserted, and will activate the drive mechanism for driving card 51 in the forward direction. As card 51 is moved, or driven, further to the right to assume the position shown in FIG. 4, roller 2 will have travelled around corner 61 of record card 51 to be positioned against side 56 of record card 51.

As follower arm 8 is rotated a distance equal to the distance between the edge of arm 54 and lug 58 on tripping channel 9 (FIGS. 2 and 5) due to leading edge 55 and corner 61 displacing roller 2, lug 58 will pick up arm 54 on crank 40. Crank 40 which is integral with arm 54 and follower 10, is freely rotatable on shaft 14 and has outwardly extending arms 50 and 39. Follower 10 carries follower arm 6, shaft 4, and roller 5. After lug 58 has picked up arm 54, continued forward movement of card 51 will cause crank 40 to rotate against the action of spring 30 which is connected to spring stud 32 on tabernacle 31 and spring stud 26 of stud plate 25. Tabernacle 31 is mounted on arm 39. After spring 30 has rotated and moved across the pivot point (shaft 14 journaled in opening 35) roller 5 is tripped into contact with side 56 of card 51. That is, continued displacement of arm 54 and integral follower 10 and follower arm 6 carrying shaft 4 and roller 5 will cause crank 40 to pass through its neutral torque position. Roller 5 will then trip into contact with side 56 of card 51 at which time arm 54 will rotate out of contact with lug 58. During further forward movement of card 51 to the position shown in FIG. 4, rollers 2 and 5 will continue to contact side 56 of card 51. The side of the card 51 opposite side 56 is guided by a rail (not shown) which serves to maintain card 51 against rails 52 and 53 and against the action of rollers 2 and 5.

Figure 2:
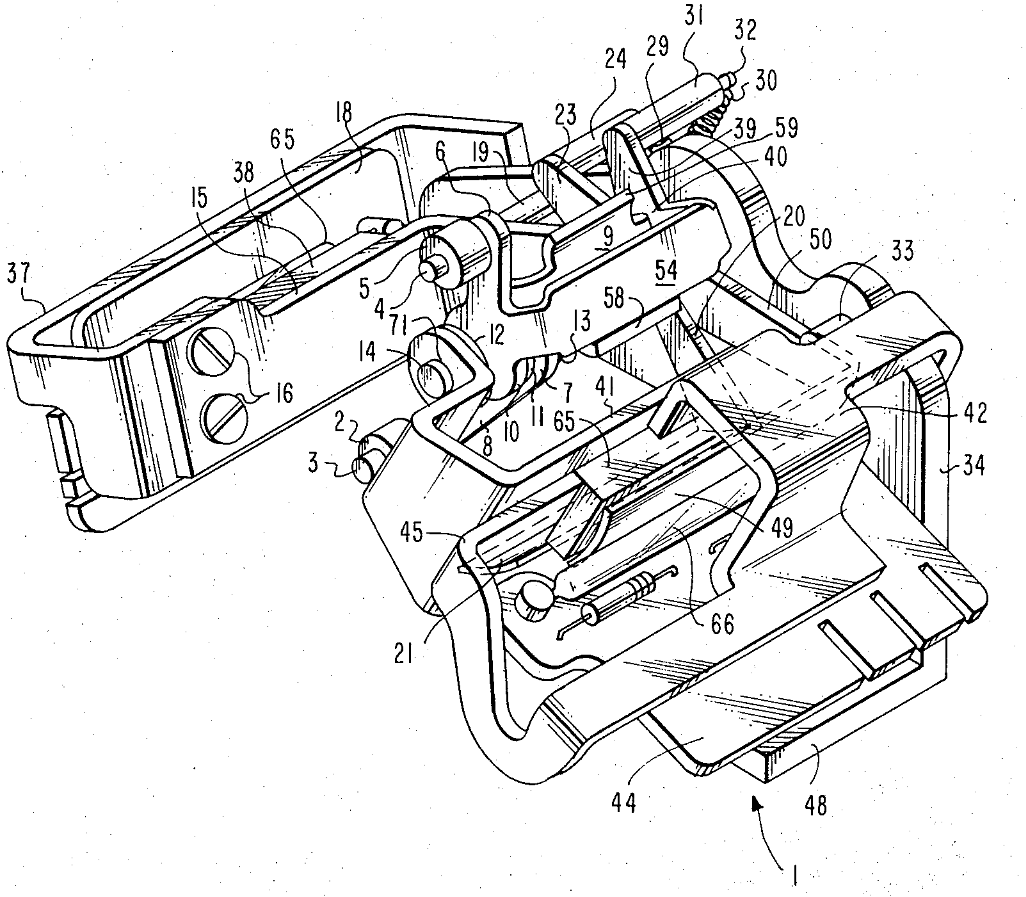
FIG. 2 is another perspective view taken from a different angle of the apparatus according to this invention.

As pointed out, the tripping of roller 5 is the result of the structural cooperation of the components making up apparatus 1. Movement, or rotation, of follower arms 6 and 8 is from the stable position shown in FIG. 3, through the card biased and quasi-stable position shown in FIG. 4, to the stable position shown in FIG. 5. In FIGS. 1 and 3, arm 20 of crank 22 is resting against stop 19 which is rigidly journaled in opening 46 of frame 34, and as shown in FIGS. 2 and 5, arm 50 of crank 40 is resting against stop 33 which is rigidly journaled in opening 36 (refer to FIG. 1) of frame 34.

Figure 4:
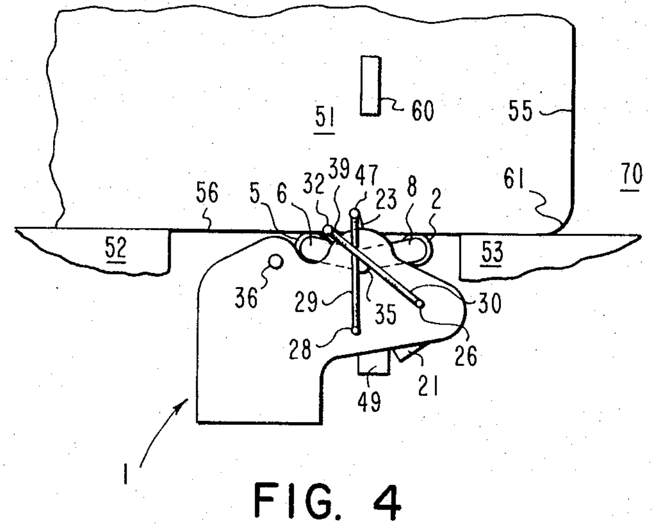
FIG. 4 is a plan view similar to FIG. 3, showing the position of the components of the apparatus when the side of the record card is sensed.
Figure 5:
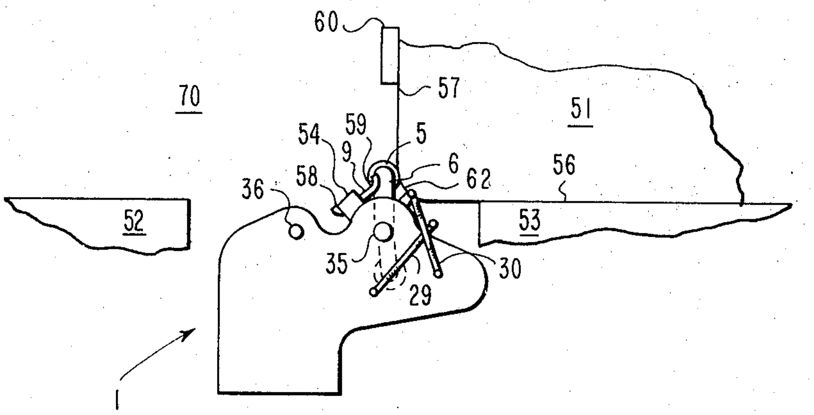
FIG. 5 is a plan view similar to FIGS. 3 and 4, and corresponds component position wise to that shown in FIG. 2.

As card 51 continues to travel to the right from the position shown in FIG. 4 to the position shown in FIG. 5, roller 5, which is biased by spring 30 against the card, will have travelled around corner 62 of record card 51 and be positioned in contact with, and biased against the trailing edge 57. During this travel of roller 5, arm 54 will contact lug 59 rotating spring 29 past the pivot point (shaft 14 journaled in opening 35), causing roller 2 to trip out of contact with side 56 of card 51. When roller 5 rounds corner 62 and comes in contact with trailing edge 57, shunting member 49 rigidly secured to arm 50 will cause reed switch 66 on circuit card 44 to be dropped, generating a signal causing the card drive mechanism to stop driving the card 51 in the forward direction and to start driving card 51 in the reverse direction for reading, writing, and/or ejection.

Rearwardly Moving Card

The driving of card 51 back along the path just described with edge 57 now becoming the leading edge causes leading edge 57 to act against roller 5. Rotation of arm 6 and shunting member 49, due to card 51 acting against roller 5, will drop reed switch 66 when the first track on card 51 is under read/write head 60 and a signal will be generated for initiating a read/write operation.

As pointed out above, the position of the shunting members 21 and 49 for picking the reed switches 65 and 66 is not the same as for dropping. It will be appreciated from viewing FIG. 5 that if the dropping and picking of reed switch 66 occurred for the same rotational position of shunting member 49, the read/write operation would begin (for a rearwardly moving card 51) before the first track on card 51 were under read/write head 60.

Upon further movement of card 51 to the left, lug 58 on tripping channel 9 will be picked up by arm 54 to drive, or rotate, roller 2 against spring 29 and through its neutral torque position. Then from the position shown in FIG. 5, roller 5 which is biased by spring 30 against the card, will travel around corner 62 and rollers 5 and 2 will be spring biased in contact with the side 56 of card 51 as shown in FIG. 4.

Continued movement of card 51 to the left will result in roller 2 travelling around corner 61 and roller 5 being tripped out of contact with card 51. With roller 2 positioned as shown in FIG. 3, shunting member 21 has dropped reed switch 65 providing a signal indicating that card 51 is out of the read/write zone and that read/write head 60 is to be turned off. Card 51 may then be ejected and the drive mechanism deactivated, or the drive mechanism can be reversed for further reading or writing.

In referring to FIGS. 1 and 2, a snug fit on shaft 14 is provided by O-clamp 13 and bearing rings 11 and 12. These are provided to reduce the play in the apparatus and for maintaining rollers 2 and 5 in alignment with the side and edges of the card.

In summary, an apparatus is provided which senses the leading edge, side, and trailing edge of a forwardly and rearwardly moving record card on a card deck. When a record card is manually, or otherwise, inserted into a card deck, the leading edge is sensed and the drive mechanism is activated for driving the card in the forward direction. When the trailing edge of the card is sensed, the drive mechanism is stopped and again activated for driving the card in the reverse direction. When the trailing edge which becomes the leading edge is sensed, the read/write head is turned on for beginning a read/write operation. The sensing of the side of the card when moving in the rearward direction is an indication that the read/write operation is to continue. When the trailing edge of the now rearwardly moving card is sensed, the read/write operation ceases and the card is, or has been, ejected, and the drive mechanism is deactivated. The device or apparatus is actuable for both a forwardly and rearwardly moving record card such that very accurate sensing of the edges and sides of the card are provided indicating the position of the card.

More specifically, for a forwardly moving record card 51, roller 2 is actuatable by the leading edge 51 causing roller 5 to trip into contact with side 58 and later be positioned in contact with the trailing edge 57. Roller 2 is positionable into contact with side 58 as card 51 moves along and is trippable out of contact with side 58 when roller 5 is in contact with the trailing edge 57. Actuation of roller 2 by the leading edge 55 causes rotation of shunting member 21 and the picking of reed switch 65, and the positioning of roller 5 in contact with trailing edge 57, causes rotation of shunting member 49 and the dropping of reed switch 66.

For a rearwardly moving record card 51, roller 5 is actuatable by edge 57 which becomes the leading edge, is positionable into contact with side 56, and is trippable out of contact with side 56 when roller 2 is positioned in contact with edge 55. Following actuation of roller 5, roller 2 is positioned in contact with side 56 and as card 51 moves along it is positioned in contact with edge 55 and roller 5 is tripped out of contact with side 56. Actuation of roller 5 causes shunting member 49 to pick reed switch 66 and the positioning of roller 2 in contact with edge 55 causes shunting member 21 to drop reed switch 65.

The signals generated upon the tripping of reed switches 65 and 66 activate and deactivate the drive mechanism for a forwardly moving card, activate and deactivate the drive mechanism for a rearwardly moving card, and initiate and stop a read/write operation for a rearwardly moving card.

While the invention has been shown and described with reference to a particular embodiment, it will be understood by those skilled in the art that various changes in form and detail may be made without departing from the spirit and scope of the invention.

What is claimed is:

1. A card position sensing apparatus for sensing the position of a record card on a card deck relative to a read/write head, said apparatus comprising:
   - a first angularly positionable means actuatable by the leading edge of a forwardly moving record card and positionable into contact with the side of said record card;
   - a second angularly positionable means cooperating with said first means and actuable into contact with the side of said record card and positionable into contact with the trailing edge of said record card; and
   - sensing means associated with said first and second means for providing signals indicative of the position of said record card relative to said read/write head.

2. An apparatus according to claim 1 wherein said first means is actuatable by the leading edge of said forwardly moving record card for tripping said second means into contact with the side of said forwardly moving record card.

3. An apparatus according to claim 1 wherein said second means is actuatable by the leading edge of a rearwardly moving record card and is positionable into contact with the side of said rearwardly moving record card.

4. An apparatus according to claim 3 wherein said first means cooperates with said second means and is actuatable into contact with the side of said rearwardly moving record card and positionable into contact with the trailing edge of said rearwardly moving record card.

5. An apparatus according to claim 1 wherein said first and second angularly positionable means are biased against said record card when in contact therewith.

6. A card position sensing apparatus for sensing the position of a record card on a card deck relative to a read/write head, said apparatus comprising:
   - a first means actuatable by the leading edge of a forwardly moving record card;
   - a second means actuatable by the leading edge of a rearwardly moving record card;
   - said second means cooperating with and trippable by said first means for a forwardly moving record card;
   - said first means cooperating with and trippable by said second means for a rearwardly moving record card;
   - sensing means associated with said first and second means for providing signals indicative of the position of a forwardly and rearwardly moving record card relative to said read/write head.

7. An apparatus according to claim 6 wherein said second means is trippable into contact with the side of a forwardly moving record card and positionable into contact with the trailing edge of a forwardly moving record card.

8. An apparatus according to claim 7 wherein said first means is trippable into contact with the side of a rearwardly moving record card and positionable into contact with the trailing edge of a rearwardly moving record card.

9. An apparatus according to claim 8 wherein said first and second means include roller followers.

10. An apparatus according to claim 6 wherein a third means is associated with said first means for actuating a first switch forming a first part of said sensing means.

11. An apparatus according to claim 10 wherein a fourth means is associated with said second means for actuating a second switch forming a second part of said sensing means.

12. An apparatus according to claim 11 wherein said third and fourth means are magnetic shunts, and wherein said first and second switches are reed switches having magnets associated therewith.

13. An apparatus according to claim 10 wherein said third means is angularly positionable along with said first means.

14. An apparatus according to claim 11 wherein said fourth means is angularly positionable along with said second means.

* * * * *